United States Patent [19]

Mase et al.

[11] Patent Number: 5,534,884
[45] Date of Patent: Jul. 9, 1996

[54] ELECTRO-OPTICAL DEVICE SYSTEM AND METHOD OF DRIVING AN ELECTRO-OPTICAL DEVICE

[75] Inventors: Akira Mase, Aichi; Shunpei Yamazaki, Tokyo, both of Japan

[73] Assignee: Semiconductor Energy Laboratory Co., Ltd., Kanagawa-ken, Japan

[21] Appl. No.: 208,802

[22] Filed: Mar. 11, 1994

Related U.S. Application Data

[63] Continuation of Ser. No. 813,757, Dec. 27, 1991, abandoned.

[30] Foreign Application Priority Data

Dec. 27, 1990 [JP] Japan ................... 2-418868
Dec. 27, 1990 [JP] Japan ................... 2-418869

[51] Int. Cl.$^6$ ........................................ G09G 3/36
[52] U.S. Cl. ................... 345/87; 345/92; 345/98; 359/59
[58] Field of Search ................. 345/87, 92, 98, 345/205, 206; 359/59

[56] References Cited

U.S. PATENT DOCUMENTS

| | | | |
|---|---|---|---|
| 4,536,856 | 8/1985 | Hiroishi | 340/784 |
| 4,685,769 | 8/1987 | Fukuma et al. | 340/784 |
| 4,864,290 | 9/1989 | Waters | 340/784 |
| 4,890,097 | 12/1989 | Yamashita et al. | 340/719 |
| 5,132,677 | 7/1992 | Nicholas | 359/59 |
| 5,165,075 | 11/1992 | Hiroki et al. | 340/784 |

FOREIGN PATENT DOCUMENTS

| | | | |
|---|---|---|---|
| 0302468 | 2/1989 | European Pat. Off. | 340/784 |
| 0321073 | 6/1989 | European Pat. Off. | 340/784 |
| 0144297 | 12/1978 | Japan | 340/784 |
| 1130131 | 5/1989 | Japan | 340/784 |
| 0217893 | 8/1990 | Japan | 340/784 |

*Primary Examiner*—Richard Hjerpe
*Assistant Examiner*—Matthew Luu
*Attorney, Agent, or Firm*—Sixbey, Friedman, Leedom & Ferguson; Gerald J. Ferguson, Jr.

[57] ABSTRACT

An electro-optical device system and a method of driving a liquid crystal display panel thereof capable of constructing clear visual images with low power consumption are described. In the display panel, a plurality of conductive pads are opposed to a back electrode with a liquid crystal layer inbetween. Control signals are supplied to the conductive pads through complementary transistors comprising a p-channel field effect transistor and an n-channel field effect transistor connected between $V_{DD}$ and $V_{SS}$ lines of a control circuit. The information being displayed is simultaneously stored in a first memory. Information desired to be displayed is stored in a second memory and compared with the content of the first memory to produce exclusive ORs thereof. The display panel is driven only when and where the information desired to be displayed is dissimilar to the information being displayed.

37 Claims, 9 Drawing Sheets

ELECTRO-OPTICAL DEVICE SYSTEM AND METHOD OF DRIVING AN ELECTRO-OPTICAL DEVICE

This application is a Continuation of Ser. No. 07/813,757, filed Dec. 27, 1991, now abandoned.

BACKGROUND OF THE INVENTION

1. Field of the Invention

The present invention relates to an electro-optical device system and a method of driving an electro-optical device and, more particularly to an electro-optical device system utilizing complementary thin film gate insulated field effect transistors and a method of driving display driving systems utilizing complimentary thin film gate insulated field effect transistors.

2. Description of the Prior Art

There have been well known in the art several liquid crystal displays utilizing super-twisted nematic liquid crystals or twisted nematic liquid crystals cooperative with thin film transistors for use in microcomputors, wordprocessors and the like.

The power consumption of the liquid crystal panel of such a display is about 250 mW in the case of a class having 640×480 pixels. This relatively much power consumption is because the nematic liquid crystal can continue its operation only when a signal is being applied thereto so that application of electric fields to the pixels of the nematic material must be continued during operation of the display. For this reason, it is very difficult to construct a display capable of operating only by energy of a dry cell for a long time, e.g. 50 to 80 hours.

On the other hand, electric appliances are now decreasing in weight and size to meet the needs of the times, and it is not desired to use heavy secondary batteries for the liquid crystal displays. Needs arise with liquid crystal panels capable of continuing operation by a dry cell for a sufficiently long time.

Recently, a new type of displays utilizing ferroelectric liquid crystals has been proposed. The ferroelectric liquid crystals have spontaneous polarizations so that memory characteristics can be accorded thereto by decreasing the gap of a pair of substrates between which the liquid crystal material is disposed by virtue of its surface stabilized condition in which transparent or intransparent state can be maintained even after the removal of applied electric fields.

A problem, however, arises also with such ferroelectric liquid crystal displays. Deterioration of images displayed, called "fixing" appears in the display possessing memory characteristics. After leaving the display with a certain image maintained unchanged for a relatively long time, it becomes impossible to completely invert the states of the pixels from transparent conditions to opaque conditions and vice versa, resulting in decrease in contrast.

An approach to solve the above problem is to utilize a liquid crystal which has only a weak power to maintain its states of pixels (lowered memory characteristics). In this case where images can be maintained during several times of scanning, however, it is impossible to maintain images until some of pixels are desired to be rewritten. The high speed of response of ferroelectric liquid crystals are still very attractive so that a solution of the "fixing problem" is demanded.

Furthermore, there is another problem in the case of ferroelectric liquid crystal displays. In the operation of the ferroelectric liquid crystal display, control signals of a high level are supplied to selected columns to turn on the thin film transistors for driving pixels. There are, however, undesirable cases in which the on-off action of the transistors can not be sufficiently carried out so that the output voltage of the transistor (i.e. the input to the pixel) reaches only short of a predetermined high voltage level (e.g. 5 V), or the output voltage does not sufficiently fall to a predetermined low voltage (e.g. 0 V). This is because of the asymmetrical characteristics of the transistors. Namely, the charging action on the liquid crystal layer takes place in a dissimilar manner as the discharging action therefrom. Furthermore, since the liquid crystal is intrinsically insulating, the liquid crystal voltage ($V_{LC}$) becomes floating when the transistor is turned off. The amount of electric charge accumulated on the liquid crystal which is equivalent to a capacitance determines the $V_{LC}$. The accumulated charge, however, will leak through a current path of a relatively low resistance $R_{GS}$ which might be formed by a pinhole in the gate insulation film, through dust or ionized impurities attracted or through the liquid crystal itself whose resistance $R_{LC}$ may be occasionally decreased. For this reason, $V_{LC}$ sometimes becomes at an indeterminate intermediate voltage level. Still further, the driving signals are often accompanied by momentary increase in current because of increase of the capacitance due to the increase of the dielectric constant accompanying the spontaneous polarization, and therefore conventional thin film transistors are not suitable for driving ferroelectric liquid crystal displays. In the case of the panel having two hundred thousands to 5 million pixels, a high yield can not be expected in such a situation.

BRIEF SUMMARY OF THE INVENTION

It is an object of the present invention to provide a method of driving liquid crystal display panels capable of operating only with low power consumption.

It is another object of the present invention to provide a method of driving liquid crystal display panels capable of displaying clear visual images.

It is a further object of the present invention to provide a method of driving liquid crystal display panels capable of accurate operation.

Additional objects, advantages and novel features of the present invention will be set forth in the description which follows, and in part will become apparent to those skilled in the art upon examination of the following or may be learned by practice of the present invention. The object and advantages of the invention may be realized and attained by means of the instrumentalities and combinations particularly pointed out in the appended claims.

To achieve the foregoing and other object, and in accordance with the present invention, as embodied and broadly described herein, a liquid crystal panel to be driven comprises a pair of substrates at least one of which is transparent, a liquid crystal layer disposed between these substrates, a plurality of conductive pads (electrodes) formed on the inside of one of the substrates in order to define pixels arranged in a matrix, a plurality of pairs of complementary transistors provided for the pixels and connected with the conductive pads respectively and a plurality of control lines formed on the one of the substrates and connected with the complementary transistors in order to supply signals to the transistors for driving. The method in accordance with the present invention comprises the step of storing, in a first memory, information equal to that being displayed in the liquid crystal panel, the step of storing, in a second memory, information desired to be displayed, the step of comparing the contents stored in the first and second memories, the step of displaying said information desired to be displayed in the liquid crystal panel by driving the pixels of the liquid crystal display corresponding to storage elements of the second memory which are dissimilar to corresponding elements of the first memory on the basis of the results of the comparing step, and the step of rewriting the corresponding elements of the first memory in order to make equal information stored in the first memory and information being displayed in the panel.

The information to be displayed is first stored in the second memory and compared with the content of the first memory which exactly corresponds to the information being displayed. On the basis of the results of the comparison, control signals are supplied to the liquid crystal panel from a control circuit only for rewriting pixels which are dissimilar to the corresponding store elements of the second memory. The control circuit supplies the control signal to each pixel through complementary transistors connected between a low level Vss and a high level $V_{DD}$. By the use of the complementary transistors, the voltage level of each pixel during its operation is prevented from fluctuating.

In typical example, the present invention is applied to ferroelectric liquid crystal displays. Each pixel of the display is provided with a switching element of complementary thin film field effect transistors which forcibly pull or push the level of the liquid crystal layer to a definite high or low voltage level rather than a floating state. The thin film transistors are formed on the substrate by suitable deposition techniques. Of course, the present invention can be practiced with a variety of other type transistors, other than thin film transistors, such as staggered types, coplanar types, inverted staggered types, inverted coplanar types. By this structure, even if a ferroelectric liquid crystal having only a poor memory characteristic is used, the "fixing" problem does not arise.

BRIEF DESCRIPTION OF THE DRAWINGS

The accompanying drawings, which are incorporated in and form a part of the invention and, together with the description, serve to explain the principles of the invention.

DETAILED DESCRIPTION OF THE PREFERRED EMBODIMENTS

Figure 1:
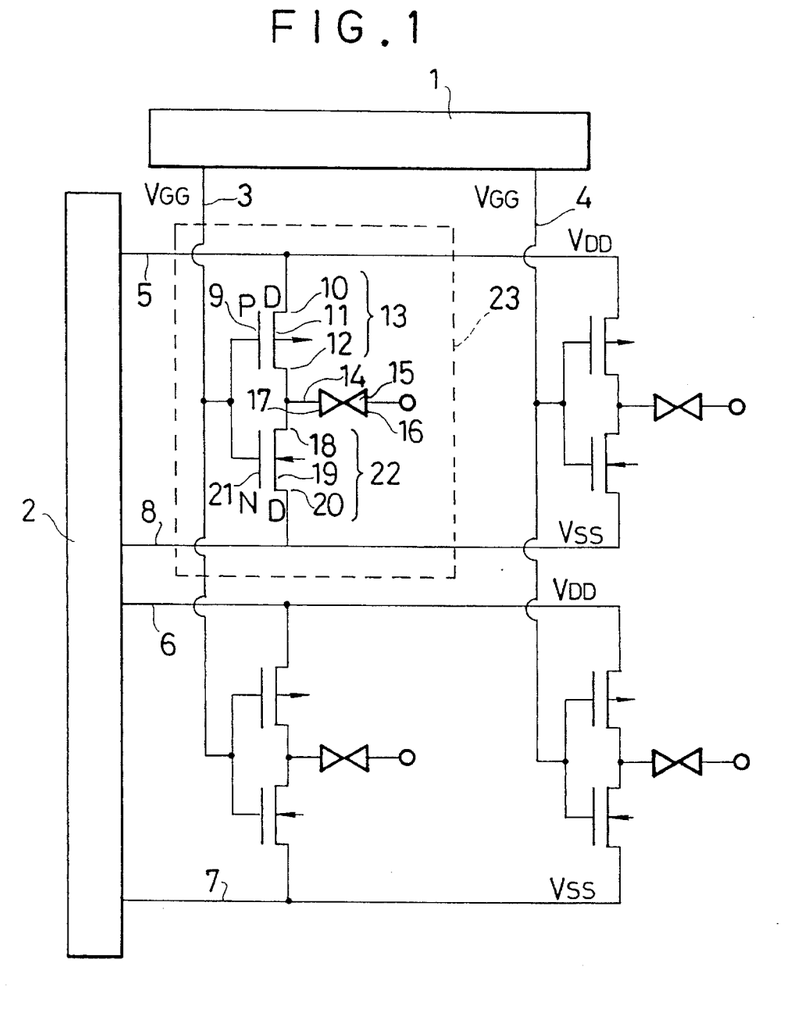
FIG. 1 is a schematic diagram showing an equivalent circuit of a liquid crystal display in accordance with a first embodiment of the present invention.
Figure 2:
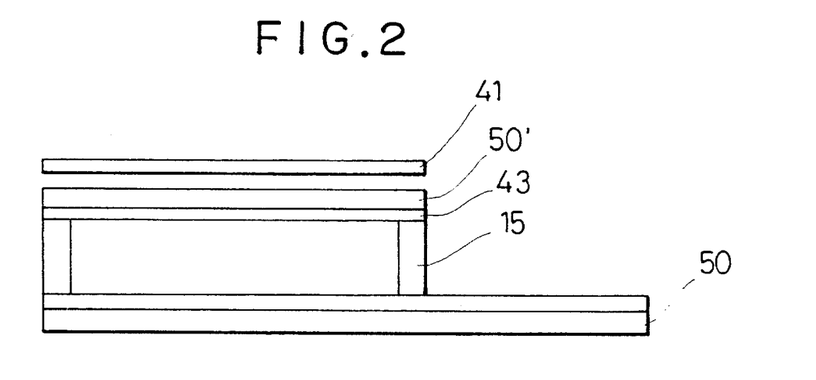
FIG. 2 is a cross sectional schematic view showing a general configuration of a liquid crystal display.
Figure 3:
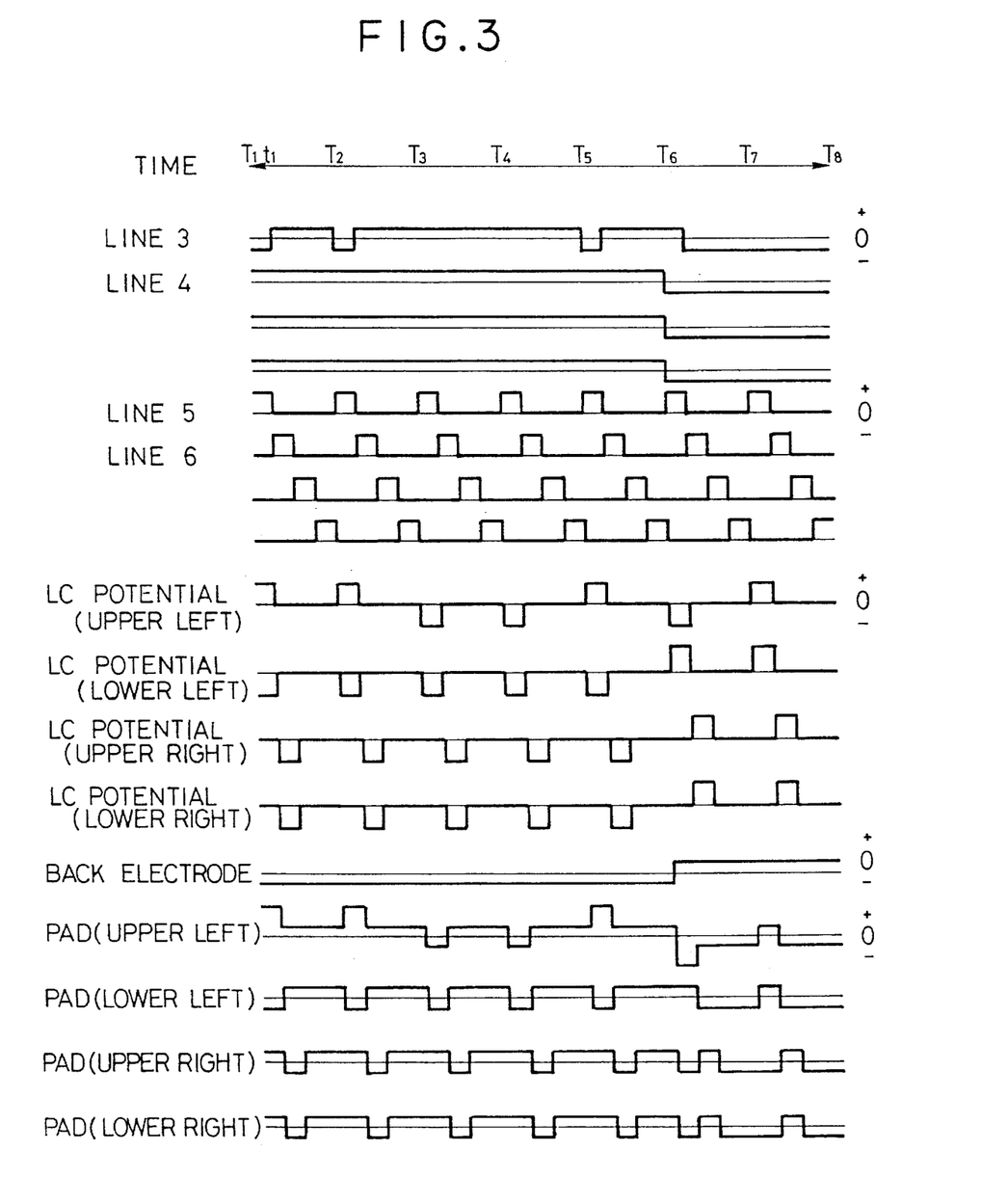
FIG. 3 is a graphical diagram demonstrating operation of the liquid crystal display in accordance with the first embodiment.

FIG. 1 is a diagram illustrating the equivalent circuit of a liquid crystal panel for a display system driven in accordance with a first embodiment of the present invention. The diagram shows only a 2×2 matrix for the sake of convenience in description whereas ordinary liquid crystal displays consist of more great numbers of pixels such as a 840×480 matrix, a 1280×980 matrix. The liquid crystal display panel includes a liquid crystal layer 15 disposed between a pair of glass substrates 50 and 50' as shown in FIG. 2. The inner surface of the glass substrate 50' is coated with a back electrode and an organic resin film given rubbing treatment. The inner surface of the other substrate 50 is provided with a plurality of conductive pads 17 each defining one pixel of the display. Each conductive pad is formed on the substrate together with CMOS transistors consisting of an n-channel thin film transistor 22 and a p-channel thin film transistor 13 whose drains 12 and 18 are electrically connected with the corresponding conductive pad. The sources of the p-channel transistors of the CMOSs on a similar row are connected with a $V_{DD}$ line 5 (6) of the row. The sources of the n-channel transistors of the CMOSs on a similar row are connected with a Vss line 8(7). The gates of the p-channel and n-channel transistors of the CMOSs on a similar column are connected with a $V_{GG}$ line 3(4) of the column. The lines 5 to 8 are connected with a row driver 2 and supplied with data signals therefrom. The $V_{GG}$ lines 3 and 4 are connected with a column driver 1 and supplied with control signal therefrom. The column driver 1 and the row driver 2 are formed on the projected end of the glass substrate as seen in the illustration of FIG. 2. FIG. 3 is an exemplary timing chart of control signals and data signals for driving the liquid crystal.

The operation of the complementary transistors will be explained. When a control signal of a low level (0 V) is supplied to the gates through the $V_{GG}$ line 3, the p-channel transistor 13 is turned on while the n-channel transistor 22 is turned off. The output terminal of the complementary transistors, i.e. the drain terminals 12 and 18 connected to the conductive pad 18, is relieved of the VSS line 8 and connected to the $V_{DD}$ line and therefore pulled up to a high voltage $V_{DD}$ (e.g. +7 V) when an input signal of the high voltage is applied to the $V_{DD}$ line 5. On the contrary, when a control signal of a high level (5 V) is supplied to the gates, the p-channel transistor 13 is turned off while the n-channel transistor 22 is turned on. The output terminal of the complementary transistors is relieved of the $V_{DD}$ line and connected to the Vss line and therefore pushed down to a low voltage (e.g. 0 V or −7 V) when an input signal of the low voltage is applied to the Vss line. In the operation of the display, the column driver 1 supplies control signals of the low level to selected columns to connect the $V_{DD}$ line with the pads on the columns and disconnect the Vss line from the pads on the columns. On the other hand, the row driver 2 supplies data signals of the high level to a selected row(s) by means of the $V_{DD}$ line to pull up the desired pads located on the selected column(s) and the selected row(s) at the same time. Namely, in the operation, the liquid crystal layer is selectively subjected to three voltage levels, i.e. −7 V, 0 V or +7 V at the respective pixels to form an arbitrary visual pattern.

Figure 4:
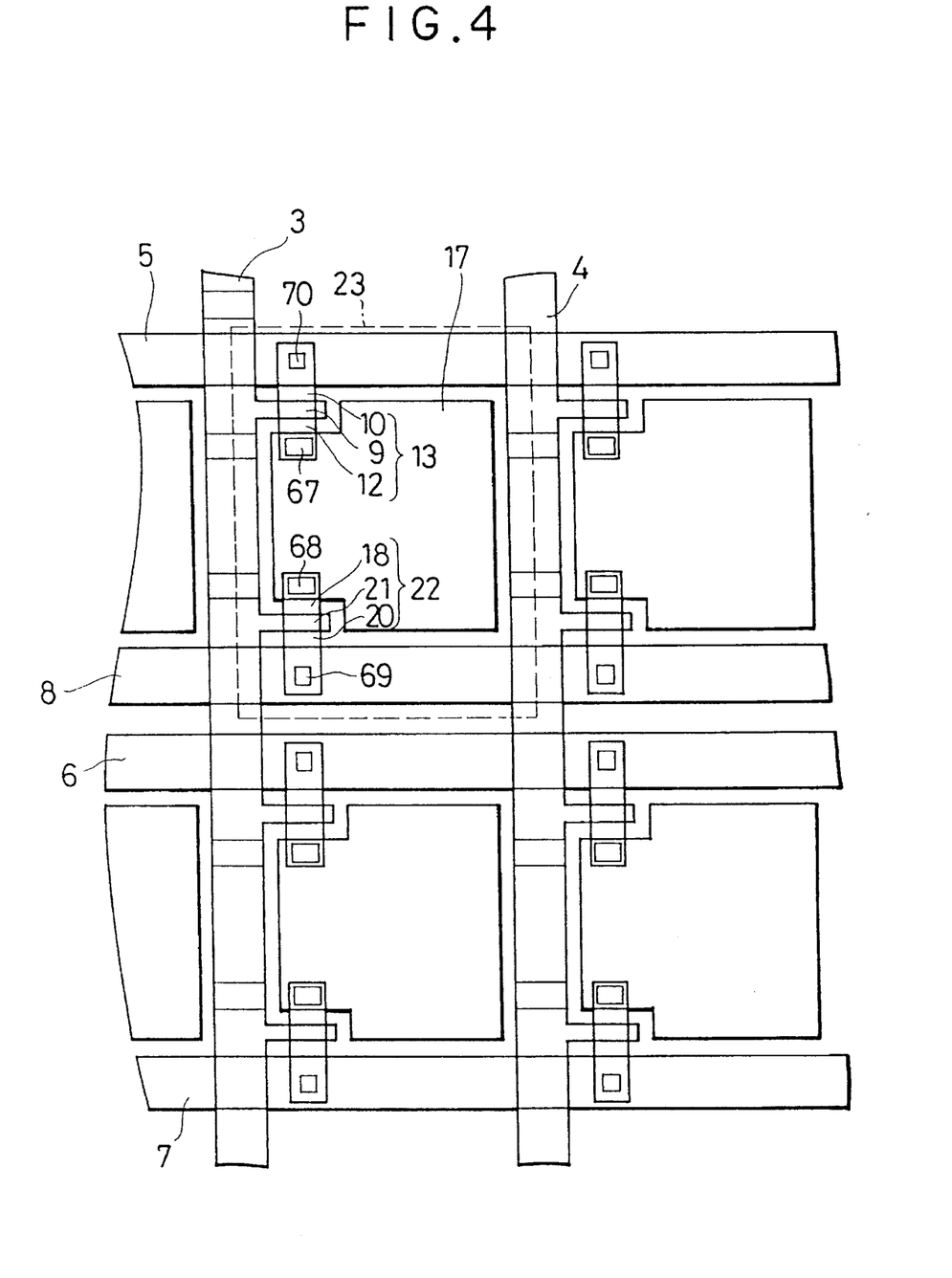
FIG. 4 is a plan view showing the liquid crystal display illustrated in FIG. 1.

FIG. 4 is a plan view of the liquid crystal display panel illustrated in FIGS. 1 and 2 showing the geometrical configuration of the circuitry fabricated on the glass substrate. The similar elements are given similar numerals so that redundant explanation will be dispensed with. One pixel 23 is enclosed by broken line in which a conductive pad 17 is connected with the source 12 of the p-channel transistor 13 through a contact 67 and the source 18 of the n-channel transistor 22 through a contact 68. The drain 20 of the n-channel transistor 22 is connected with the Vss line 8 through a contact 69. The drain 10 of the p-channel transistor 13 is connected with the $V_{DD}$ line 5 through a contact 70. By repeating the structure in the column and row directions, a large area display can be constructed in a matrix of 840×480 pixels or 1280×980 pixels.

Figure 5:
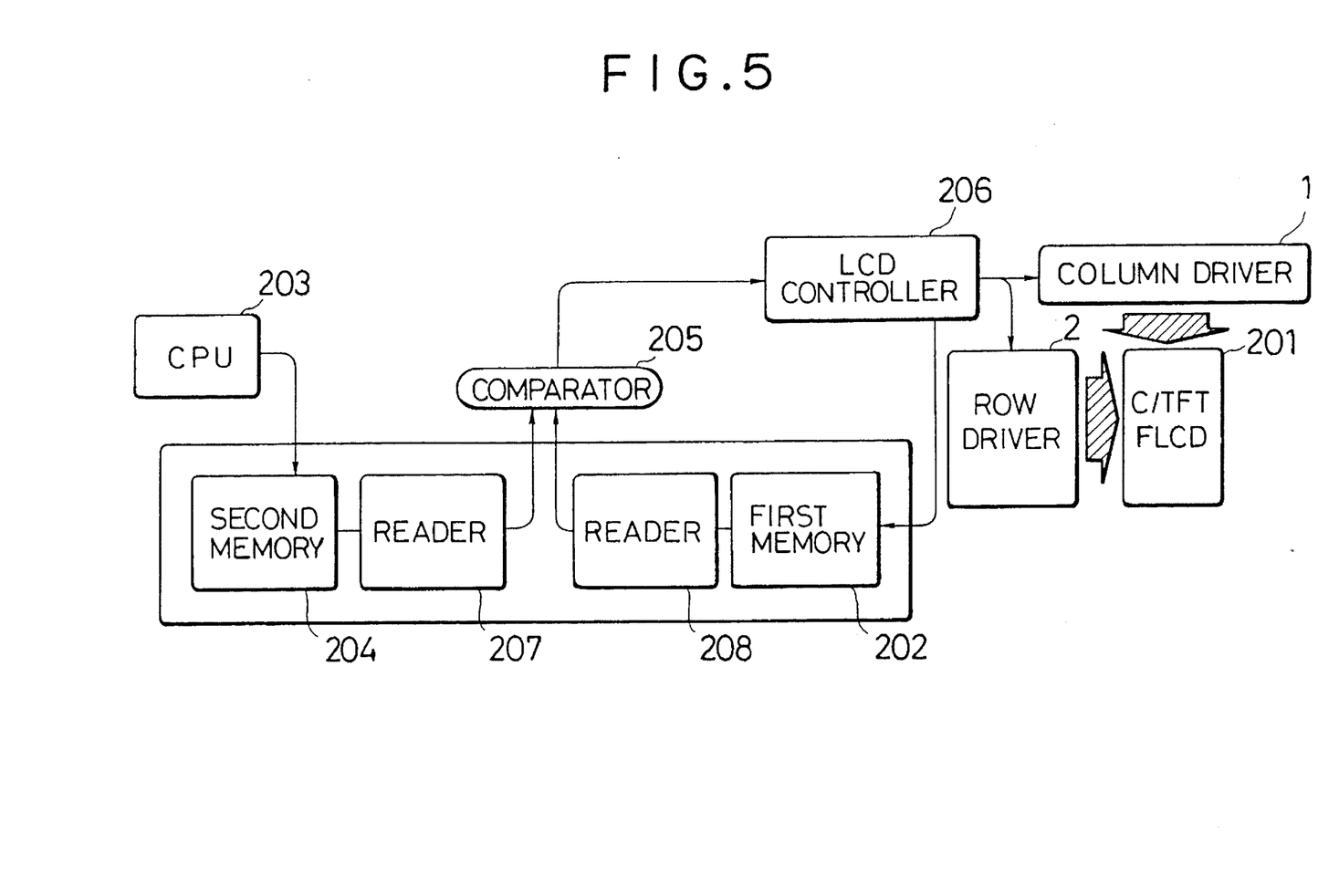
FIG. 5 is a block diagram showing the peripheral circuit for driving the liquid crystal display in accordance with the present invention.

Next, a method of driving the liquid crystal display panel in accordance with the present invention will be explained in conjunction with FIG. 5. The column driver 1 and the row driver 2 are connected with a LCD controller 208 from which data signals and control signals are supplied. The same information as displayed in the liquid crystal display 201 is stored in a first memory 202 connected with the LCD controller 208. On the other hand, a CPU (microprocessor) of a computer or wordprocessor provides information to be displayed in the liquid crystal display 201 and stores it in a second memory 204. The storage elements each holding one bit information of the first and second memories are respectively related to the pixels of the liquid crystal panel in a one-to-one correspondence. The contents stored in the first and second memories 202 and 204 are read out by means of readers 207 and 208. (For example, logical variables "1" and "0" are stored in the storage elements of the first and second memories 202 and 204 as the contents thereof.) The corresponding bits are compared with each other in a comparator 205 in order to produce exclusive ORs thereof. A "1" of the exclusive OR indicates that the corresponding bit stored in the second memory by the CPU is dissimilar to (or disagree with) the corresponding pixel displayed. The LCD controller 206 is connected with the comparator 205 and supplies necessary control signals and data signals to the row and column drivers only for inverting the bits which are dissimilar to the corresponding bits stored in the second memory. The LCD controller rewrites the corresponding bits stored in the first memory in the same manner in order to make the contents of the first memory identical to the information displayed. The rewriting procedure of the first memory can be carried out at the same time as or just after the driving of the liquid crystal panel depending upon the ability of the controller 206. In the case utilizing a display having 640×400 pixels as the liquid crystal display 201, SRAMs (static random access memories) of 256K bites are used as the first and second memories 202 and 204. The use of such static memories is for the purpose of high speed operation.

Figure 6:
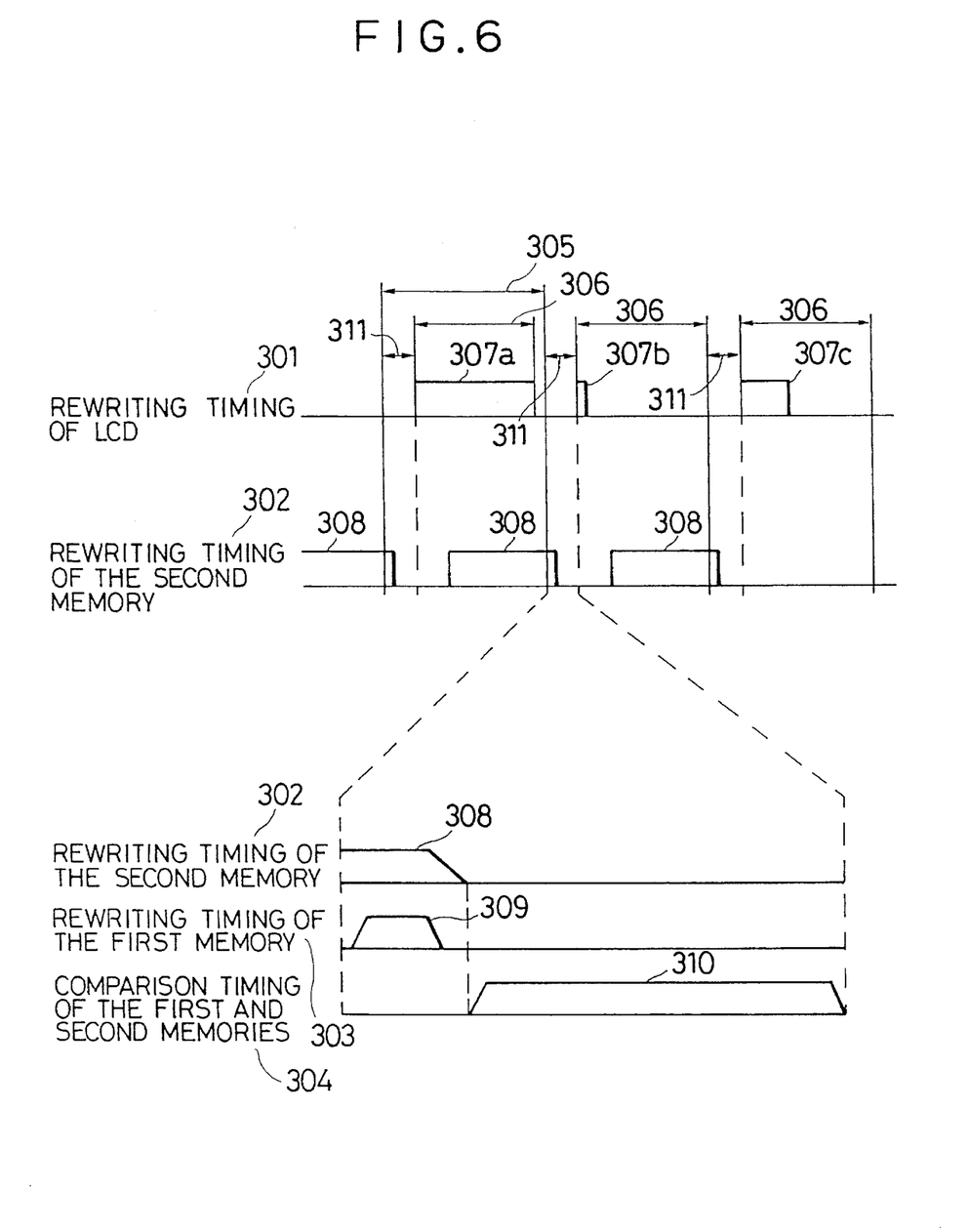
FIG. 6 is an explanatory diagram showing the timing of operation of the liquid crystal display.

The timing chart of driving the liquid crystal display is illustrated in FIG. 6. One unit frame is indicated by arrow 305. The frame consists of a LCD writing period 306 and a control period 311. For example, the length of a unit frame is 14 msec (about 71.4 Hz) divided into the LCD writing period of 13.9 msec and the control period of 0.1 msec. Numerals 307a, 307b, ... designate periods in which the LCD is actually driven for rewriting. These periods are within the LCD writing period of 13.9 msec and vary depending on the number of pixels to be rewritten in the respective frames because the control and data signals are supplied only for inverting the bits which are dissimilar to the corresponding bits of the previous frame. In the control period 311, which is detailedly shown in an expanded diagram as in the lower part of the diagram, the first memory is rewritten in period 309 followed by comparison between the contents of the first and second memories. The entirety of second memory is rewritten for each frame by means of the CPU 203 in a period 308 which has a constant length extending into the control period 311 as illustrated.

Figure 7:
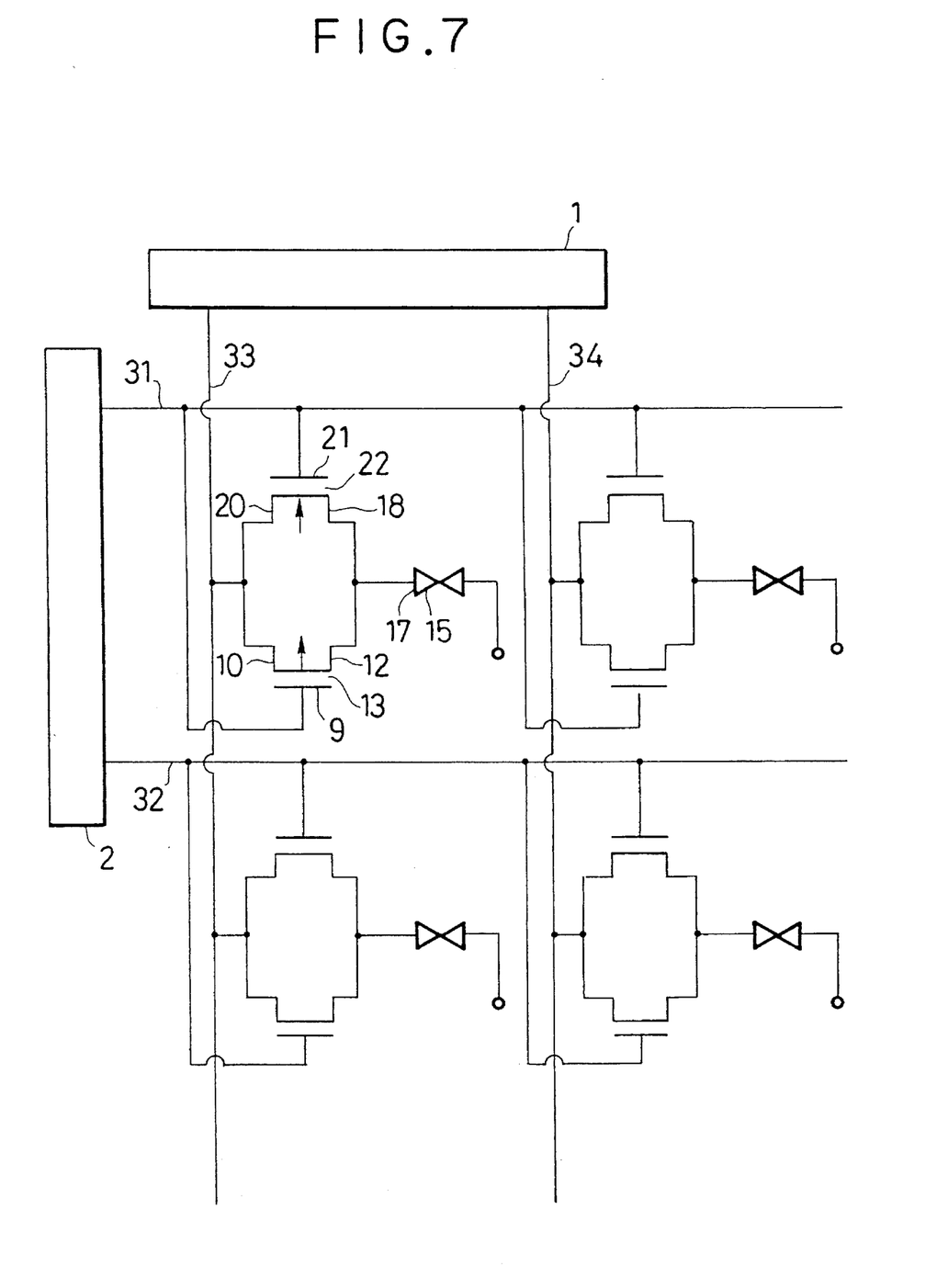
FIG. 7 is a schematic diagram showing an equivalent circuit of a liquid crystal display in accordance with a second embodiment of the present invention.
Figure 8:
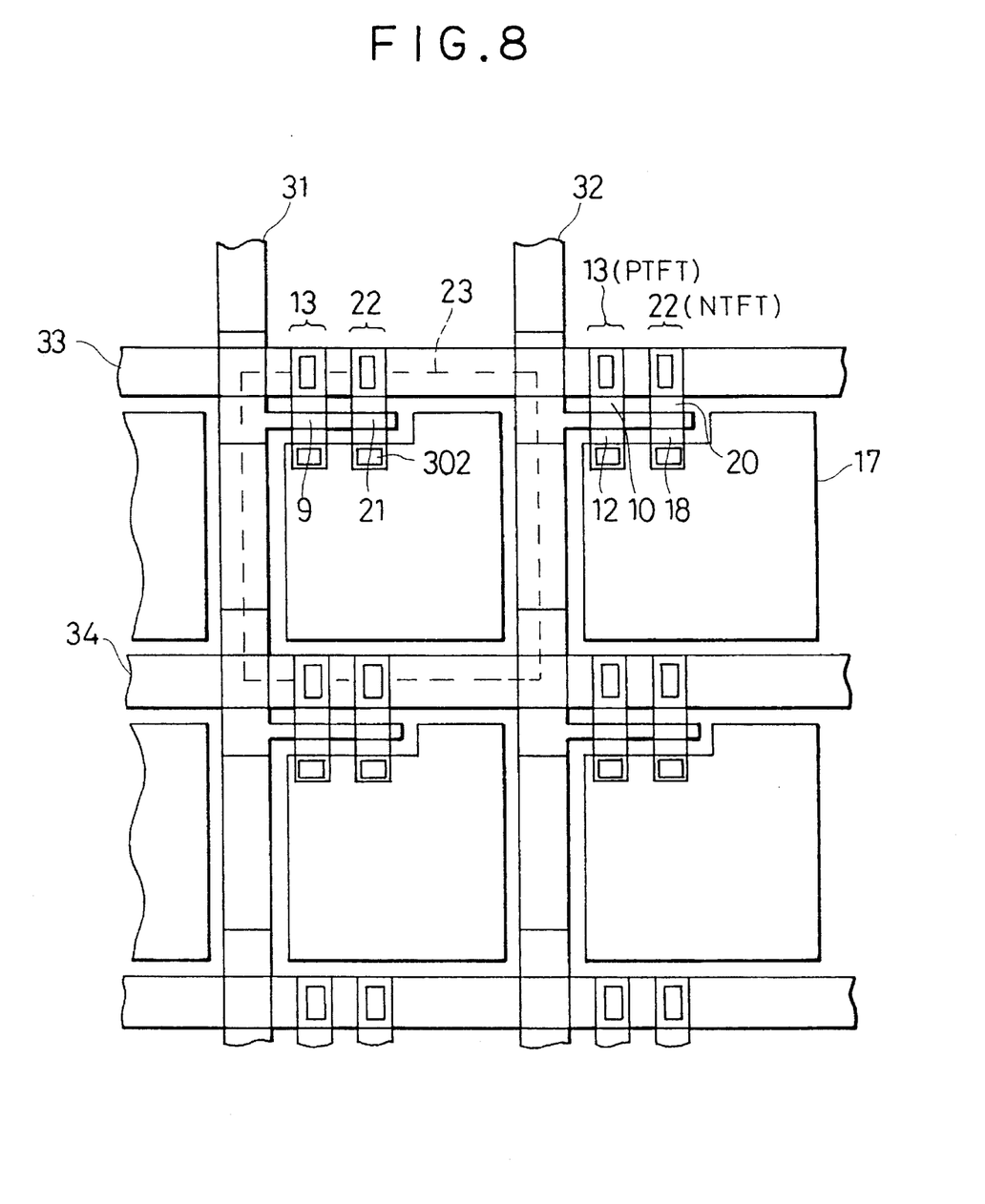
FIG. 8 is a plan view showing the liquid crystal display illustrated in FIG. 7.
Figure 9:
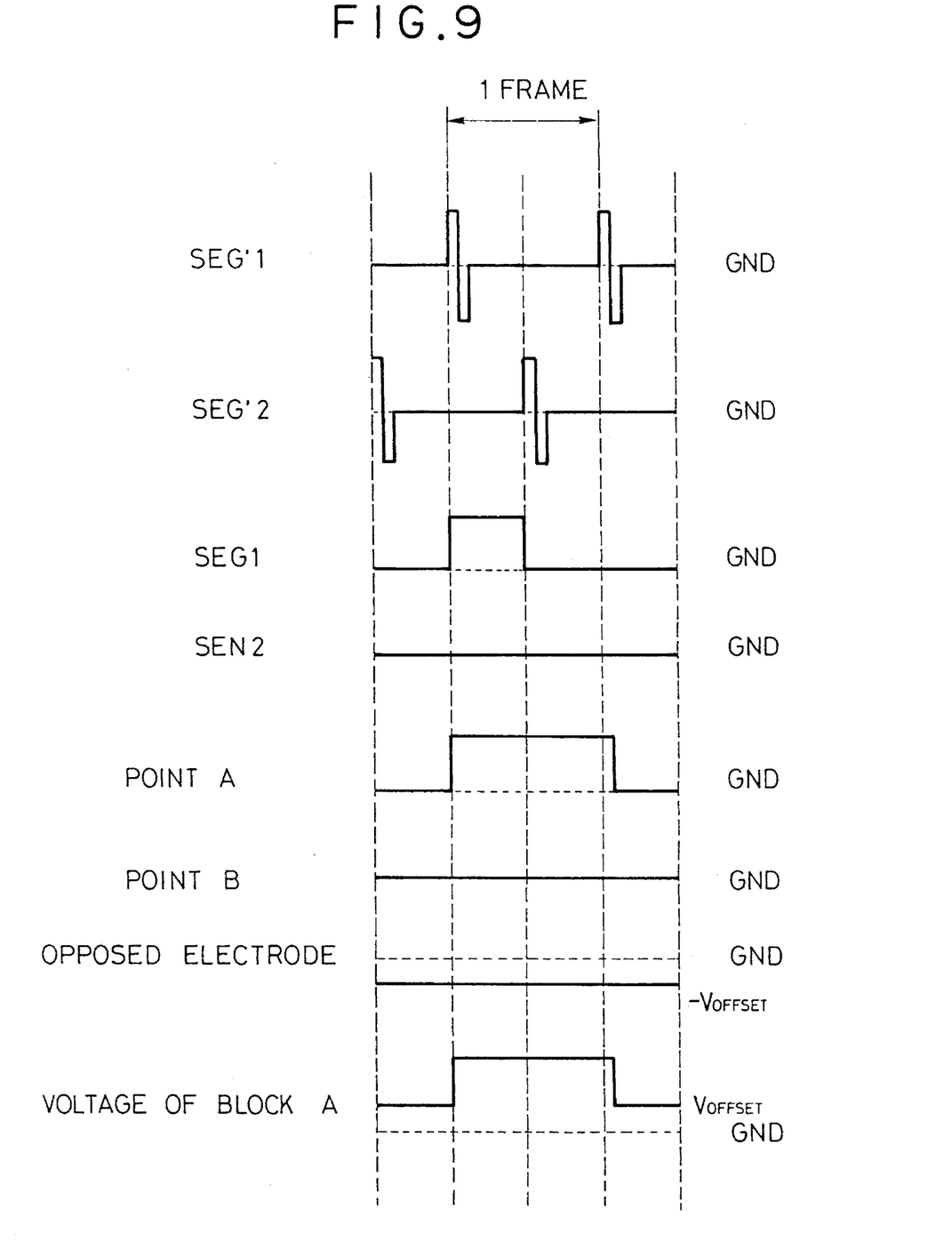
FIG. 9 is a graphical diagram demonstrating operation of the liquid crystal display in accordance with the second embodiment.

Referring to FIG. 7, a liquid crystal display panel driven in accordance with a second embodiment of the present invention is described. A number of pixels are arranged in a matrix and supplied with signals from column and row drivers 1 and 2 in the same manner as the previous embodiment. A pair of complementary MOS transistors comprising an n-type thin film transistor 22 and a p-type thin film transistor 13 are provided for each pixel and connected in series between the conductive pad 17 of the pixel and the control line 33 of the column driver 1 to constitute a transfer gate. The drain terminal of one transistor is tied to the source terminal of the other and vice versa. The gate terminals 9 and 21 of the complementary transistors are supplied with signals from the row driver 2. A desired pixel can be arbitrarily selected by applying a positive signal to the gate from the row driver 2 when a positive signal is being applied to the column including that pixel from the column driver 1 through the line 33(34). The entire configuration of the driving system for the liquid crystal display is the same as that for the previous embodiment as illustrated in FIG. 5. FIG. 8 is a plan view showing the geometry of the pattern of the circuitry as shown in FIG. 7. The n-channel and p-channel transistors are formed just adjacent to each other between the corresponding conductive pad and the line 33(34). The timing chart of driving the liquid crystal display is illustrated in FIG. 9.

In accordance with experiments, power consumption of a liquid crystal panel according to the present invention, when the panel is driven as a display of a wordprocessor, was 20 to 30 mW, which is approximately 1/10 of power consumption of conventional super twisted nematic liquid crystal displays, i.e. 250 mW on the average.

Referring now to FIG. 10, a method of manufacturing the thin film field effect transistors 13 and 22 in accordance with the preferred embodiments of the invention will be described in detail. This exemplary method can be commonly applicable for either of the embodiments of this description.

A glass substrate 50 is made from an inexpensive glass which can endure thermal treatment at high temperatures up to 700° C., e.g. about, 800° C. such as AN glass or pylex glass. A $SiO_2$ film 51 is deposited on the substrate 50 in a magnetron sputtering apparatus as a blocking film to a thickness of 1000 Å to 3000 Å in a 100% $O_2$ atmosphere (0.5 Pa) at a substrate temperature of 150° C. The output power of the apparatus is 400 W to 800 W in terms of 13.58 MHz RF energy. A single crystalline silicon or a quartz block is used as a target. The deposition speed is 30 to 100 Å/min.

An amorphous silicon film 52 is next deposited in the sputtering apparatus on the $SiO_2$ film 51 to a thickness of 500 to 5000 Å, e.g. 1500 Å. The total density of oxygen in the amorphous film does not exceed $5\times10^{21}$ $cm^{-3}$, typically no higher than $7\times10^{19}$ $cm^{-3}$, preferably no higher than $1\times10^{19}$ $cm^{-3}$. Such low density makes it easy to recrystallize the source and the drain to be formed in the silicon film in the latter step by thermal treatment at a low temperature only within a relatively short time. If the density of oxygen is too low, however, current leakage in an off condition is increased when a back light is employed for illuminating the display. For this reason, the density is selected between $4 \times 10^{19}$ cm$^{-3}$ and $4 \times 10^{21}$ cm$^{-3}$. In accordance with experiments, the density of hydrogen was measured to be $4 \times 10^{20}$ cm$^{-3}$ equivalent to one atom % assuming that the density of silicon was $4 \times 10^{22}$ cm$^{-3}$. The atmosphere in the sputtering apparatus comprises a mixture consisting of hydrogen and argon so that H$_2$/(H$_2$+Ar)=0.8 (0.2 to 0.8 in general) in terms of partial pressure, e.g. argon at 20% and hydrogen at 80%. The hydrogen and argon gases have desirably purities of 99.999% and 99.99% respectively and are introduced after the inside of the apparatus is evacuated to a pressure not higher than $1 \times 10^{-5}$ Pa. The total pressure is 0.5 Pa: the output power of the apparatus is 400 W to 800 W of 13.56 MHz RF energy: a single crystalline silicon desirably containing oxygen atoms at a concentration of no higher than $5 \times 10^8$ cm$^{-3}$, e.g. $1 \times 10^8$ cm$^{-3}$ is used as a target: and the substrate temperature is maintained at 150° C. (deposition temperature). In preferred embodiments, the deposition temperature between 50° C. and 500° C., e.g. 150° C.; the output power between 1 W and 10 MW in a frequency range from 500 Hz to 100 GHz which may be combined with another pulse energy source.

Alternatively, the amorphous silicon film 52 may be deposited by low pressure CVD (LPCVD) or plasma CVD. In the case of LPCVD, the deposition is carried out by introducing disilane (Si$_2$H$_6$) or trisilane (Si$_3$H$_8$) in a suitable CVD chamber. The pressure of the chamber is 30 to 300 Pa for example during deposition. The deposition temperature is selected at a temperature 100° C. to 200° C. lower than the recrystallization temperature of the glass substrate, i.e. 450° C. to 550° C., for example 530° C. The deposition speed is 50 to 250 Å/min. Boron may be introduced at $1 \times 10^{15}$ cm$^{-3}$ to $1 \times 10^{18}$ cm$^{-3}$ into the film by using diborane as a dopant gas together with the silane in order to make even the threshold voltages of N-type and P-type TFTs. In the case of plasma CVD, the deposition is carried out by introducing monosilane (SiH$_4$) or disilane (Si$_2$H$_6$) at 300° C. in a suitable plasma CVD chamber. The input energy is for example high frequency electric energy at 13.56 MHz.

After the substrate is coated with the silicon oxide film and the amorphous silicon semiconductor films, thermal treatment is given thereto at an intermediate temperature of 450° C. to 700° C., typically at 600° C. for 12 to 70 hours in a non-oxidizing atmosphere, e.g. in nitrogen or hydrogen. The film is recrystallized by this treatment (thermal annealing) in the form of semi-amorphous or semi-crystalline structure.

Since the amorphous silicon oxide film 51 underlies the silicon semiconductor film, there is no particular seed so that the semiconductor film is uniformly thermal annealed. Namely, the semiconductor is deposited in an amorphous phase in which hydrogen is simply mixed thereinto. By this annealing, the semiconductor film is partially recrystallized to form highly ordered regions. These regions have a tendency to convert their phases to more ordered phases (partial recrystallization). As a result, the peak of its Raman spectra (522 cm$^{-1}$: the peak of single crystalline silicon) is displaced to the low frequency direction. The apparent grain diameter calculated based on the half-width is 50 to 500 Å which seems to indicate existence of microcrystals. These regions appear in the form of a number of cluster.

The energy bands of the clusters are connected through the Si—Si bonds anchoring the clusters at the interfaces therebetween through which carriers can travel. For this reason, the polycrystalline (semi-amorphous or semi-crystalline) structure of silicon in accordance with the present invention is entirely different than usual polycrystals in which grain boundaries provide barriers against carrier transportation, so that the carrier mobility can be on the order of 15 to 300 cm$^2$/V·sec (electron mobility) and 10 to 200 cm$^2$/V·sec (hole mobility) which are higher than those of polycrystals. Namely, the semi-amorphous or semi-crystalline structure in accordance with the present invention is believed substantially not to include undesirable grain boundaries.

When the semiconductor film is annealed at a high temperature of 900° to 1200° C. rather than at the above intermediate temperature, the carrier mobility is significantly decreased by existence of impurities such as oxygen, carbon, nitrogen occurring due to segregation at grain boundaries by solid growth from seeds and therefore it is very difficult to obtain 10 cm$^2$/V·sec or higher mobilities.

The amorphous silicon semiconductor film is patterned by means of a photomask as indicated by <1> to leave areas 52 which are necessary to form N-channel and P-channel transistors. After all the substrates are coated with the silicon oxide and amorphous silicon semiconductor films and patterned as described above, the entire structure is then coated with a silicon oxide film 54 of a thickness of 500 Å to 2000 Å, e.g. 1000 Å by sputtering in an oxide atmosphere as illustrated in Step B of FIG. 10. The deposition condition is same as that of the silicon oxide film 51 explained above. The characteristics at the interface between the silicon oxide film 54 and the underlying semiconductor film 52 can be improved by applying ultraviolet rays to carry out ozone oxidation. Namely, the interface states can be decreased by utilizing photo-CVD in combination with the sputtering explained in the description of deposition of the oxide film 51. Alternatively, fluorine may be introduced in this deposition in order to fix sodium ions. In this case, the atmosphere comprises a high density oxygen (95%) including NF$_3$ (5%) at a total pressure of 0.5 Pa: the output power of the apparatus is 400 W in terms of 13.56 MHz RF energy: a single crystalline silicon or an artificial quartz is used as a target: and the substrate temperature is maintained at 100° C. By this procedure, the silicon oxide film 54 to be a gate insulating film includes fluorine atoms which function to terminate dangling bonds of silicon atoms so that the formation of fixed charge can be prevented at the interface between the semiconductor films 52 and the oxide film 54. On the silicon oxide film 54 is deposited by low pressure CVD a silicon semiconductor film of 0.2 μm thickness which is highly doped with phosphorus at $1 \times 10^{21}$ to $5 \times 10^{21}$ cm$^{-3}$ followed, if desired, by coating a conductive film of 0.3 μm thickness made of molybdenum, tungsten, MoSi$_2$ or WSi$_2$ to constitute a multi-layered film. The multi-layered film comprising the semiconductor film and the conductive film is then patterned by photolithography with a suitable mask <2> in order to form gate electrodes 21 and 9 to form channels of 10 μm length and 20 μm width.

Figure 10A:
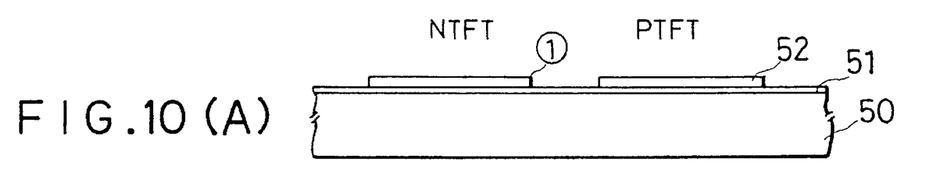
FIG. 10 shows cross sectional views of Steps A through F of a method of manufacturing complementary transistors suitable for the embodiments of the present invention.
Figure 10B:
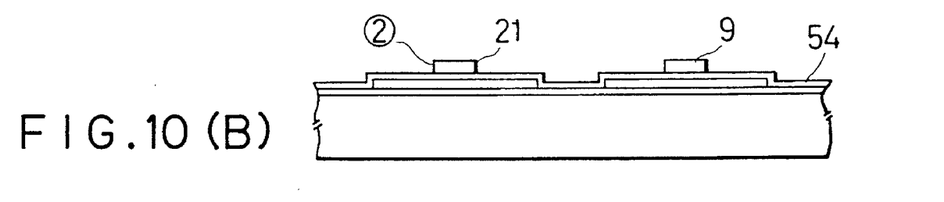
Figure 10C:
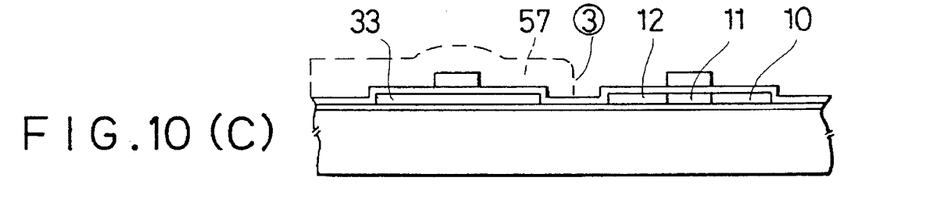
Figure 10D:
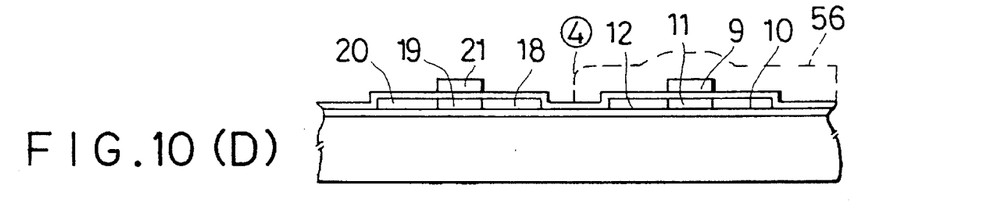
Figure 10E:
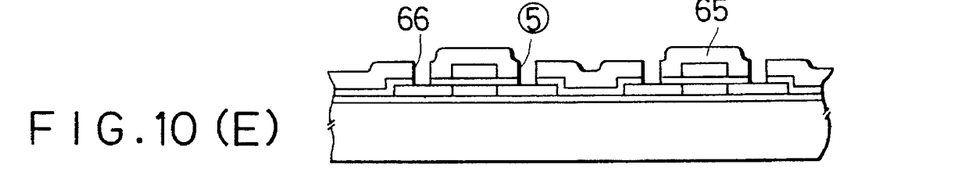
Figure 10F:
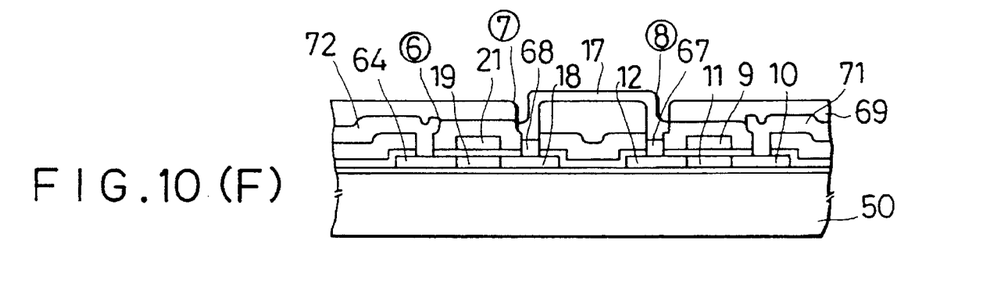

A photoresist film 57 is formed by the use of a photomask <3> in order to cover the left half of the illustrated structure (Step C). With the gate electrode 9 and the photoresist film 57, self-aligned impurity regions, i.e. a source and a drain region 12 and 10 are formed by ion implantation of boron at $1 \times 10^{15}$ cm$^{-2}$ to $5 \times 10^{15}$ cm$^{-2}$. The intermediate region 11 of the silicon semiconductor film 52 between the impurity regions 10 and 12 is then defined as a channel region of semi-amorphous silicon as illustrated in FIG. 10(C). After removing the photoresist film 57, another photoresist film 56 is formed by the use of a photomask <4> in order to cover the right half of the illustrated structure (Step D). With the gate electrode 21 and the photoresist film 56, self-aligned impurity regions, i.e. a source and a drain region 18 and 20 are formed by ion implantation of phosphorus at $1\times10^{15}$ $cm^{-2}$ to $5\times10^{15}$ $cm^{-2}$. The intermediate region 19 of the silicon semiconductor film 33 between the impurity regions 18 and 20 is then defined as a channel region of semi-amorphous silicon semiconductor as illustrated in FIG. 10(D). The channel lengths of the p-channel and n-channel transistors are 10 μm respectively. The channel widths of the p-channel and n-channel transistors are 20 μm respectively. The ion implantation may instead be carried out by selectively removing the silicon oxide film 54 by the use of the gate electrode 9 or 21 as a mask followed by direct ion implantation of boron or phosphorus.

Optionally, the channel regions 11 and 19 of the transistors are doped with oxygen by ion implantation to $5\times10^{20}$ $cm^{-3}$ to $5\times10^{21}$ $cm^{-3}$. The oxygen implantation is employed for the purpose of avoiding undesirable influence of illumination upon the transistors due to the photoconductivity of the channel regions. If the transistors are formed only for the peripheral circuit which is not exposed to illumination rather than for directly driving the pixels, the oxygen implantation is not employed in order to maintain high speed operation of the peripheral circuit.

After removing photoresist 56, the semiconductor films are then thermally annealed at 600° C. for 10 to 50 hours in a $H_2$ atmosphere to make active the impurities in the regions 10, 12, 18 and 20 in order to form $P^+$ and $N^+$ drain and source regions with the semi-amorphous semiconductor channel regions 11 and 19 therebetween respectively. An interlayer insulating film 65 of silicon oxide is deposited to a thickness of 0.2 to 0.4 μm by the same sputtering method as described above over the entire surface of the structure followed by etching by means of a photomask <5> for opening contact holes 66 through the interlayer film 65 and the oxide film 54 in order to provide accesses to the underlying source and drain regions. The deposition of the interlayer insulating film 65 may instead be carried out by LPCVD, photo-CVD, ordinal pressure CVD(TEOS-ozone). Next, an aluminum film of 0.5 to 1 μm thickness is deposited on the structure over the contact holes 66 and patterned to form lead electrodes 71 and 72 and contacts 67 and 68 by means of a photomask <6> as illustrated in FIG. 10, Step F. After an organic resin film 69 such as a transparent polyimide resin film is coated in order to make flat the upper structure, contact holes are opened in the same manner by means of a photomask <7>. A transparent conductive film such as an indium tin oxide film is deposited over the structure and patterned by means of a photomask <8> to provide lead electrode 17 to be electrically connected with the pad of a pixel. The ITO film is deposited by sputtering at room temperature to 150° C. followed by annealing in an oxidizing atmosphere ($O_2$) or in air at 200° to 400° C. The pad can be integrally formed at the same time by the deposition of the lead electrode 17. Then, the formation of CMOS transistors is finished. The mobility, the threshold voltage of the p-channel TFT are 20 $cm^2$/Vs and −5.9 V. The mobility, the threshold voltage of the n-channel TFT are 40 $cm^2$/Vs and +5 V. The glass substrate is thus provided with these CMOS transistors and suitable conductive patterns as illustrated. This substrate is called the first substrate in the following description. On the other hand, a counterpart glass substrate, called the second substrate here, is provided with a common electrode and 5% polyimide precursor solution diluted by NMP(n-methyl-2-pyrolydon) coated on the common electrode by offset press printing at its entire inner surface followed by pre-firing at 50° C. and main-firing at 380° C. for an hour in nitrogen. Finally, rubbing treatment is given to the second substrate in order to provide an orientation control surface.

The perimeter of the first substrate is coated with an epoxy resin film to a thickness of 50 μm. The width of the epoxy film is about 100 μm. On the other hand, 2.5 μm diameter $SiO_2$ particles and 4.5 μm diameter epoxy particles are dusted on the second substrate at densities of 200 $mm^{-2}$ and 50 $mm^{-2}$ respectively as spacers. Then, the first and second substrates are joined to each other followed by injection of a ferroelectric liquid crystal material between the two substrates. The distance of the substrates is selected to be about 1.5 to 3.5 μm, e.g. 2.3 μm and only one of the inner surfaces (the surface of the common electrode) is provided with an orientation control film given suitable rubbing treatment. A pair of polarizing plates are attached to the external surfaces of the substrates. One of the advantages of the above process is that the formation of these transistors can be carried out at temperatures no higher than 700° C. so that the process does not require the use of expensive substrates such as quartz substrates and therefore suitable for large scale liquid crystal displays production methods.

In the above embodiment, thermal annealing is carried out twice at the steps corresponding to Steps A and D of FIG. 10. The first annealing (Step A), however, can be omitted to shorten the process time.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated. Examples are as follows:

The present invention can be applied to displays utilizing other types of semiconductor devices such as germanium or silicon/germanium ($Si_xGe_{1-x}$) semiconductor devices, in which case the thermal treatment can be done at temperatures approx. 100° C. lower than those used for silicon semiconductors in the above embodiments. The deposition of such semiconductor can be carried out by sputtering in a high energy hydrogen plasma caused by optical energy (shorter than 1000 nm wavelength) or electron cyclotron resonance (ECR).

Although a pair of complementary MOS transistors are connected to a conductive pad for each pixel in the above embodiments, two or more pairs of complementary transistors can be utilized, for each pixel, and connected to a conductive pad which in turn may comprises two or more divided parts each connected to one or more pairs of complementary transistors.

What is claimed is:

1. An electro-optical device system comprising:

a liquid crystal panel comprising a pair of substrates at least one of which is transparent, a liquid crystal layer disposed between said substrates, a plurality of electrodes formed on an inside of one of said substrates in order to define pixels arranged in a matrix, a plurality of pairs of complementary transistors provided for said pixels and connected with said electrodes respectively and a plurality of control lines formed on said inside of one of said substrates and connected with said complementary transistors in order to supply signals to said transistors;

a first memory having storage elements related to said pixels respectively in a one-to-one correspondence for storing a frame of the same information as said panel is displaying;

a second memory for sequentially receiving information desired to be displayed in said panel, said second memory having storage elements for storing a frame related to said pixels respectively in a one-to-one correspondence;

computer means for providing to said second memory said information desired to be displayed in said panel;

a comparator for comparing the contents of said first memory and said second memory; and a controller operatively connected with said first and second memories and said liquid crystal panel for driving the said storage elements of said first memory and the said pixels of said liquid crystal panel which are dissimilar to the corresponding storage elements of said second memory in order to display said information desired to be displayed in said panel and to make information stored in said first memory equal to information being displayed in said panel.

2. The system of claim 1 wherein said control lines comprises a plurality of column control lines extending in the column direction of said matrix and a plurality of row control lines extending in the row direction of said matrix.

3. The system of claim 1 wherein said first and second memories comprise static random access memories.

4. The system of claim 2 wherein said controller drives said liquid crystal panel through a column driver for supplying signals to said column control lines and a row driver for supplying signals to said row control lines.

5. The system of claim 1 wherein said first and second memories are provided with readers respectively through which information contained in said memories is transmitted to said comparator.

6. The system of claim 1 wherein said comparator produces exclusive ORs of corresponding storage elements of said first and second memories.

7. The system of claim 1 wherein said liquid crystal layer comprises a ferroelectric liquid crystal.

8. An electro-optical device system comprising:

a liquid crystal panel comprising a pair of substrates at least one of which is transparent, a liquid crystal layer disposed between said substrates, and a plurality of pixels each of which is provided with a p-channel transistor, an n-channel transistor, and an electrode on an inside of one of said substrates with said electrode connected to one of source and drain terminals of said p-channel transistor and one of source and drain terminals of said n-channel transistor;

a plurality of column control lines provided on said inside of one of said substrates;

a plurality of pairs of row control lines provided on said inside of one of said substrates;

a first memory comprising storage elements for storing a current display frame of pixels;

a second memory comprising storage elements for receiving information to be displayed in said panel and for storing a next display frame of pixels;

computer means for providing to said second memory said information to be displayed in said panel;

a comparator for comparing a content stored in each of said storage elements of said second memory with a content stored in corresponding one of said storage elements of said first memory;

a controller, which is connected to the other one of the source and drain terminals of said p-channel transistor and the other one of the source and drain terminals of said n-channel transistor through corresponding pair of said row control lines and is connected to gate terminals of the p-channel transistor and the n-channel transistor of each of said pixels through corresponding one of said column control lines, for driving the pixels corresponding to the storage elements of said first memory which are dissimilar to the corresponding storage elements of said second memory in the comparison by supplying an electric signal to the transistors through said column control lines and said row control lines from said controller in order to display said information in said panel.

9. The system of claim 8 wherein said comparator produces exclusive ORs of corresponding storage elements of said first and second memories.

10. The system of claim 8 wherein said information is given to the transistors through the column control lines and the transistors are selectively made active by supplying control signals through the row control lines.

11. The system of claim 8 wherein said first and second memories comprise static random access memories.

12. The system of claim 8 wherein said liquid crystal layer comprises a ferroelectric liquid crystal.

13. A method of driving an electro-optical device comprising a pair of substrates at least one of which is transparent, a liquid crystal layer disposed between said substrates, a plurality of electrodes formed on an inside of one of said substrates in order to define pixels arranged in a matrix, a plurality of pairs of complementary transistors provided for said pixels and connected with said electrodes respectively and a plurality of control lines formed on said inside of one of said substrates and connected with said complementary transistors in order to supply signals to said transistors for driving, said method comprising:

storing, in a first memory, a frame of first information equal to that being displayed in said electro-optical device;

storing, in a second memory, a frame of second information desired to be displayed;

providing to said second memory from a computing means said second information desired to be displayed;

comparing the information stored in said first memory and the information stored in said second memory;

displaying said second information in said electro-optical device by driving the pixels corresponding to storage elements of said second memory which are dissimilar to corresponding elements of said first memory on the basis of the result of said comparing step; and rewriting said corresponding elements of said first memory in order to make equal information stored in said first memory and information being displayed in said electro-optical device.

14. The method of claim 13 wherein a content stored in each of storage elements of said first and second memories during said storing steps is expressed by a logical variable and the pixels corresponding to storage elements of said second memory which disagree with corresponding storage elements of said first memory about logical variables thereof are driven in said displaying step.

15. The method of claim 14 wherein the disagreement is determined by said comparing step.

16. The method of claim 13 wherein exclusive ORs of corresponding storage elements of said first and second memories are produced in said comparing step in order to indicate agreement and disagreement of respective corresponding elements of said first and second memories.

17. The method of claim 13 wherein said second information is given to said complementary transistors through first control lines extending in one of column and row directions of said matrix and said complementary transistors are selectively made active by supplying control signals through second control lines extending in the other of the column and row directions of said matrix.

18. The method of claim 17 wherein said one direction is the column direction and said the other direction is the row direction.

19. The method of claim 13 wherein said information stored in said second memory is displayed next to said information stored in said first memory.

20. The method of claim 13 wherein said first and second memories comprise static random access memories.

21. The method of claim 13 wherein said liquid crystal layer comprises a ferroelectric liquid crystal.

22. A method of driving an electro-optical device comprising a pair of substrates at least one of which is transparent, a liquid crystal layer disposed between said substrates, a plurality of electrodes provided on an inside of one of said substrates in order to define pixels arranged in a matrix, a plurality of complementary transistors comprising p-channel transistors and n-channel transistors provided on said inside of one of said substrates with source terminals or drain terminals of said p-channel transistors and said n-channel transistors connected to said electrodes, a plurality of column control lines provided on said inside of one of said substrates and connected to gate terminals of the complementary transistors of corresponding columns, and a plurality of row control lines provided on said inside of one of said substrates and connected to source terminals or drain terminals, which are not connected to said electrodes, of the p-channel transistors and the n-channel transistors of corresponding rows, said method comprising:

storing, in a first memory, a frame of first information equal to that being displayed in said electro-optical device;

storing, in a second memory, a frame of second information desired to be displayed;

providing to said second memory from a computing means said second information desired to be displayed;

comparing the information stored in said first memory and the information stored in said second memory;

displaying said second information in said electro-optical device by driving the pixels corresponding to storage elements of said second memory which are dissimilar to corresponding elements of said first memory on the basis of the result of said comparing step, said second information being supplied to the pixels through the column control lines and the row control lines; and rewriting said corresponding elements of said first memory in order to make equal information stored in said first memory and information being displayed in said electro-optical device.

23. The method of claim 22 wherein a content stored in each of storage elements of said first and second memories during said storing steps is expressed by a logical variable and the pixels corresponding to storage elements of said second memory which disagree with corresponding storage elements of said first memory about logical variables thereof are driven in said displaying step.

24. The method of claim 23 wherein the disagreement is determined by said comparing step.

25. The method of claim 22 wherein exclusive ORs of corresponding storage elements of said first and second memories are produced in said comparing step in order to indicate agreement and disagreement of respective corresponding elements of said first and second memories.

26. The method of claim 22 wherein said second information is given to said complementary transistors only through the column control lines and said complementary transistors are selectively made active by supplying control signals through the row control lines.

27. The method of claim 22 wherein said information stored in said second memory is displayed next to said information stored in said first memory.

28. The method of claim 22 wherein one of said electrodes is connected to one of source and drain terminals of one of said p-channel transistors and to one of source and drain terminals of one of said n-channel transistors.

29. The method of claim 28 wherein gate terminals of said one of said p-channel transistors and said one of said n-channel transistors are connected to each other and to one of said column lines.

30. The method of claim 29 wherein source terminals of said one of said p-channel transistors and said one of said n-channel transistors are connected to each other and drain terminals of said one of said p-channel transistors and said one of said n-channel transistors are connected to said row control lines.

31. The method of claim 30 wherein one of said row control lines is connected to the other one of the source and drain terminals of said one of said p-channel transistors.

32. The method of claim 29 wherein the other one of the source and drain terminals of said one of said p-channel transistors is connected to one of said row control lines and the other one of the source and drain terminals of said one of said n-channel transistors is connected to another one of said row control lines.

33. The method of claim 22 wherein said first and second memories comprise static random access memories.

34. The method of claim 22 wherein said liquid crystal layer comprises a ferroelectric liquid crystal.

35. An electro-optical device system comprising:

a liquid crystal device having a plurality of pixels;

a first memory for storing a current display frame of pixels;

a second memory for storing a next display frame of pixels;

computer means for providing to said second memory each pixel of said next display frame;

a comparator for comparing said first and second memories; and a controller for rewriting only those pixels of said liquid crystal device for which contents of said first and second memories differ and for changing only those pixels of the first memory which correspond to the rewritten pixels of the liquid crystal device.

36. The system of claim 35 wherein said liquid crystal device comprises a ferroelectric liquid crystal.

37. The system of claim 35 wherein said liquid crystal device is an active matrix type device.

* * * * *